No. 669,261. Patented Mar. 5, 1901.
C. W. MICHAEL.
CULTIVATOR.
(Application filed Dec. 5, 1900.)
(No Model.) 4 Sheets—Sheet 3.

Witnesses.

Inventor.

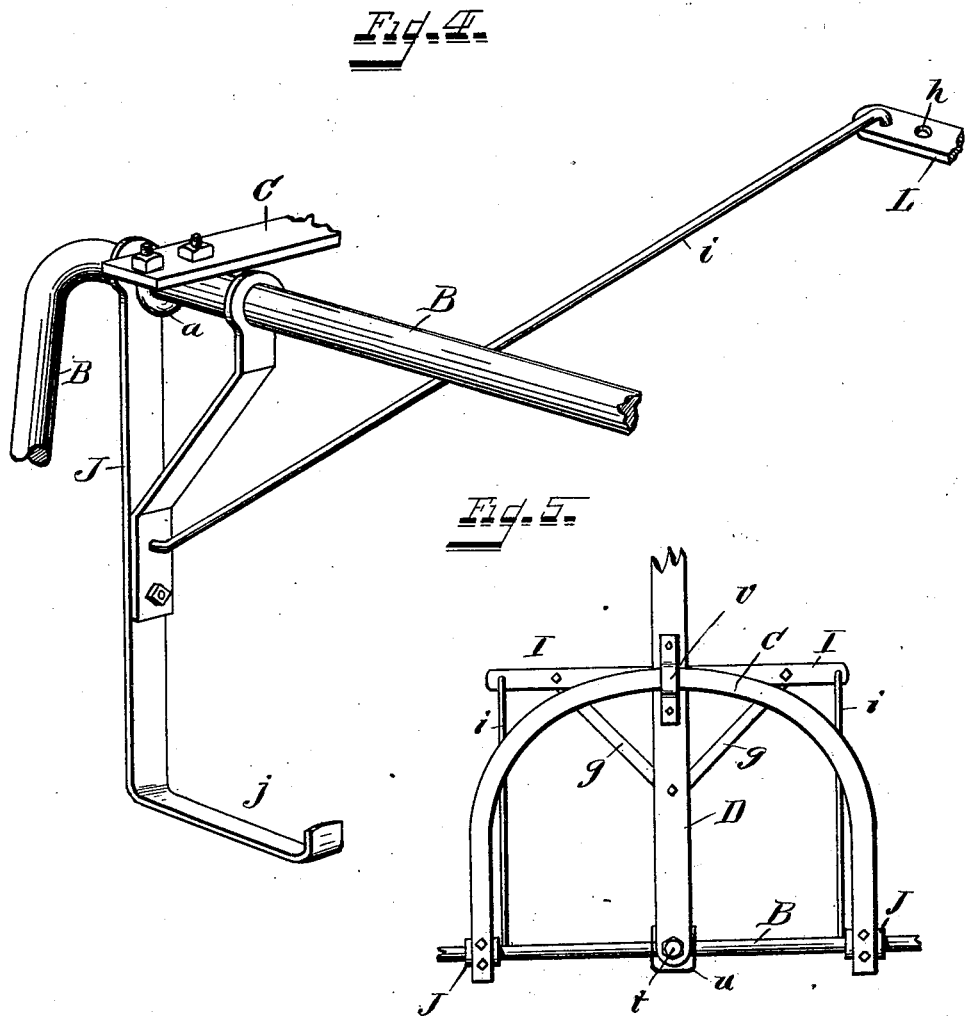

UNITED STATES PATENT OFFICE.

CLEMENT W. MICHAEL, OF DAYTON, OHIO, ASSIGNOR TO THE STODDARD MANUFACTURING COMPANY, OF SAME PLACE.

CULTIVATOR.

SPECIFICATION forming part of Letters Patent No. 669,261, dated March 5, 1901.

Application filed December 5, 1900. Serial No. 38,810. (No model.)

*To all whom it may concern:*

Be it known that I, CLEMENT W. MICHAEL, a citizen of the United States, residing at Dayton, in the county of Montgomery and State of Ohio, have invented certain new and useful Improvements in Cultivators, of which the following is a full, clear, and exact description, reference being had to the accompanying drawings, forming part of this specification.

My invention relates to riding straddle-row cultivators; and it has for its object the construction of such cultivators with the pole or tongue and wheel-frame pivoted together, in connection with foot-operated mechanism, so that the driver while employing both hands to manage the team can with his feet swing the wheel-frame to guide the machine either to the right or to the left to follow sinuosities in the rows without in the least changing the direction of travel of the team, for in cultivating it is very desirable to cause the cultivating disks or teeth to move sidewise to follow irregularities in the rows of the crop in order to prevent injury or destruction to plants that are out of line with the row. Heretofore, so far as I am aware, this purpose has only been accomplished in one of three ways—namely, by a hand-lever for guiding the wheel-frame, which required one hand of the driver constantly to do the guiding and left him only one hand to manage and guide the team, or, secondly, by changing the direction of the team itself, and thereby guiding the machine bodily, which was objectionable, because the damage done to the crop by the horses would be far greater than the destruction of any plants that might be out of line with the row, or, finally, by angling the disk-gangs by special mechanism to cause the machine to travel from one side to the other. My invention, on the contrary, is embodied in a simple construction whereby the driver with his feet can guide the wheel-frame from side to side to cause the cultivators to follow the irregularities of the row and without changing the direction of the team and while having both hands free to manage and guide the team, all as will be hereinafter more fully set forth, and specifically pointed out in the claims.

Figure 1:
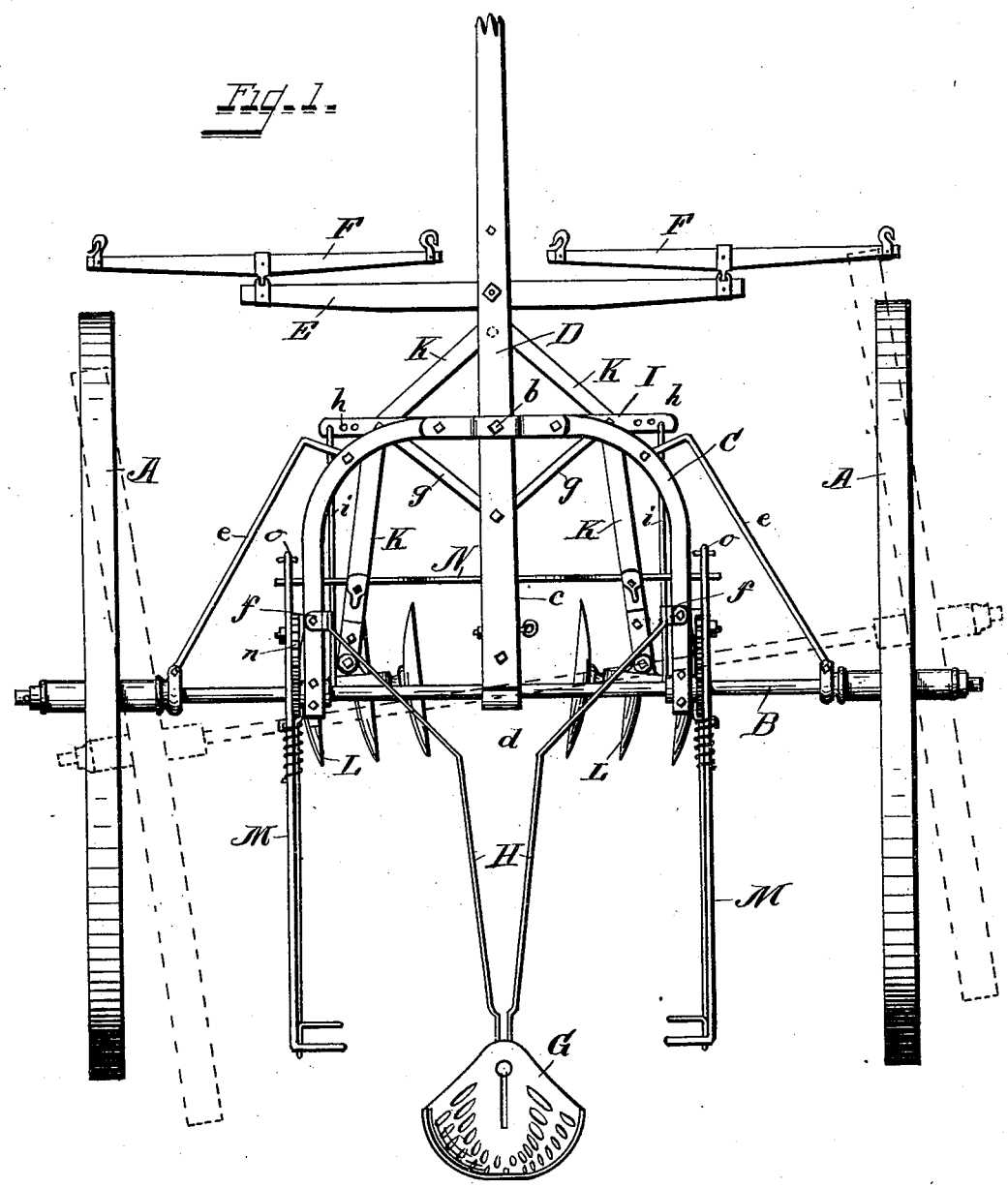
Figure 2:
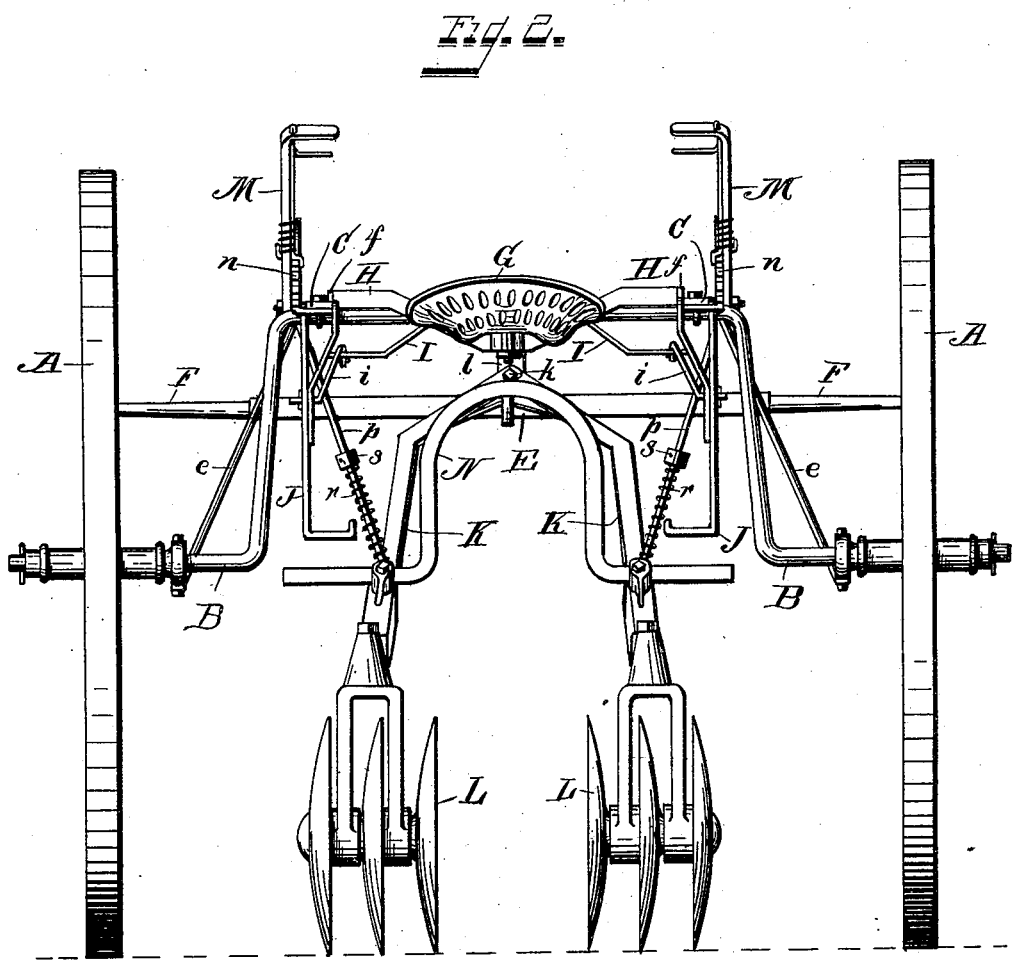
Figure 3:
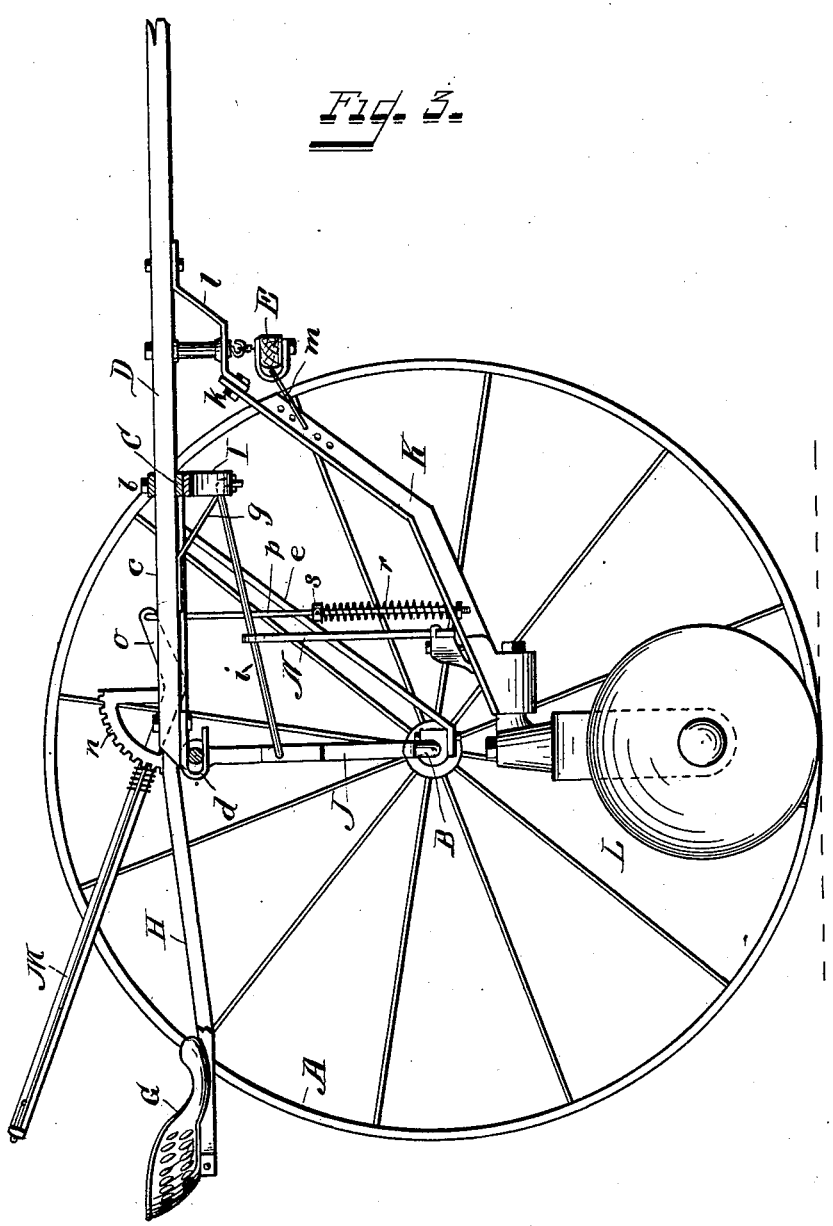

In the accompanying drawings, Figure 1 is a plan view of a cultivator embodying my invention. Fig. 2 is a rear elevation of the same. Fig. 3 is a sectional side elevation near the middle of the machine, looking to the left of Figs. 1 and 2. Fig. 4 is an enlarged detail perspective of the foot-lever mechanism. Fig. 5 is a diminished plan view of so much of the framework as is necessary to represent a modification in the construction.

The same letters of reference are used to indicate identical parts in all the figures.

A A represent the supporting or carrying wheels, journaled on stubs of the usual or any suitable arch or straddle-row axle B. Fast to the upper side of the arch of the axle B—in this instance by means of U-bolts $a$, Fig. 4—is a forwardly-extending frame C, composed, in this instance, of a flat metal bar rounded at its forward corners, so as to be substantially U-shaped. The pole or tongue D, carrying the doubletree E and singletrees F, is pivoted, as at $b$, to the transverse portion of the frame-bar C, as seen in Fig. 1, and has a rearward extension $c$, carrying a metal hook $d$, which, as seen in Fig. 3, loosely embraces the arch of the axle B at its middle when the pole and wheels are parallel. There is sufficient play between the hook $d$ and the arch of the axle B to permit the wheels and axle to be vibrated in either direction to throw the wheels out of parallelism with the tongue on the pivot $b$, as shown by the dotted lines in Fig. 1. Brace-rods $e$ connect the forward part of the frame C with the stub portions of the axle near the wheels to maintain the axle in a constant upright position. The driver's seat G is carried on the rear ends of two bars H, which, extending forward, forked, as shown, and resting upon the arch of the axle, have their forward ends secured, as at $f$, to the frame-bar C. Rigidly secured to the tongue, in this instance directly under the forward part of the frame-bar C, is a transverse bar I, preferably of metal, at right angles to the tongue, to which it is rigidly braced by arms $g$ and of a length about equal to that of the frame C. Pivoted in any one of a series of adjusting-holes $h$ at each end of the bar I is the forward end of a rearwardly-extending rod $i$, whose rear end, as seen particularly in Fig. 4, is pivoted to a pendent forked bay J, whose upper end is pivotally hung upon the arch of the axle B and whose lower end is provided with a footpiece or stirrup $j$ within reach of the driver's feet, which constantly rest thereon. It results from this construction that with the pole held in a constant forward line between the two horses when the driver presses with his foot upon the left-hand stirrup $j$, the bar I being held rigidly, the left side of the axle will be thrown backward and the right side forward, as seen by the dotted lines in Fig. 1, thereby angling the wheels to the line of draft and causing the entire wheel-frame to travel to the left to any degree or extent desired. The same pressing forward of the right-hand stirrup $j$ will throw the right-hand side of the axle back and will angle the wheels in the opposite direction to cause the wheel-frame to travel to the right, as will be readily understood, and thus the driver, with both hands free to manage his team, which is going forward constantly in a straight line, can guide his wheel-frame with his feet to cause it to move or zigzag from one side to the other as occasion requires.

The cultivator drag-bars K are in this instance bent inward at their forward ends, extend upward, and are pivoted by a bolt $k$, Fig. 3, to a bracket-arm $l$, secured to the under side of the pole, though they might be pivoted to any part of the frame without departing from my invention. I also prefer to suspend the doubletree from the bracket $l$ and to adjustably hitch it by means of links $m$. The rear ends of the drag-bars carry gangs of cultivator-disks L, which are united thereto in any well-known manner to give them proper adjustments of angling or tipping, as is common in disk cultivators. My invention, however, is not limited to the employment of disks for doing the cultivating, as the rear ends of the drag-bars might be forked and provided with shovels or plows.

M represents the usual hand lock-levers, engaging with segment-racks $n$ and pivoted to the frame C at each side, and with bell-crank extensions $o$, connected by pivoted rods $p$ with the drag-bars for raising and lowering the disk-gangs, the pivot-bolt $k$ being loose enough in its bearings to permit the necessary vertical play. A coiled spring R surrounds each of the rods $p$ between a stop $s$ thereon and the drag-bars for exerting a yielding pressure upon the disk-gangs, as is common in this class of machines.

It will be readily understood from the foregoing and from the employment of the usual or any suitable spacing-bar N, uniting the drag-bars, that when the wheel-frame is guided to one side or to the other in the manner before explained the disk-gangs will follow in a corresponding manner, and thus be guided to enable the driver to follow irregularities in the rows and cultivate close up to the plants without danger of injury and without changing the direction of his team.

While I prefer to pivot the tongue to the wheel-frame at its forward end, as heretofore described, it is evident that the same result can be accomplished if the rear end of the tongue was pivoted, as at $t$, Fig. 5, to a block or bearing $u$, fast upon the arch of the axle, in which event the forward end of the frame-bar C would slide through a strap-guide $v$, fast upon the tongue, as will be readily understood.

Having thus fully described my invention, I claim—

1. In a riding straddle-row cultivator, the combination of a wheel-frame, a pole pivoted thereto on a vertical pivot, cultivators carried by the machine, and means within reach of the driver's feet for causing the angling of the wheel-frame to the pole by foot-pressure to guide the wheel-frame and the cultivators sidewise, substantially as described.

2. In a riding straddle-row cultivator, the combination of a wheel-frame, a pole pivoted thereto on a vertical pivot, foot-levers pivoted to the wheel-frame and connected by a fixed fulcrum with the tongue, and cultivators carried by the frame of the machine, whereby upon pressing upon either of said foot-levers the wheel-frame is angled to the tongue to guide said frame and the cultivators sidewise, substantially as described.

3. In a riding straddle-row cultivator, the combination of a wheel-frame, a pole pivoted thereto on a vertical pivot, foot-levers pivoted to the wheel-frame and connected by a fixed fulcrum with the tongue, and disk cultivators carried by the frame of the machine, whereby upon pressing upon either of said foot-levers the wheel-frame is angled to the tongue to guide it and the disk cultivators sidewise, substantially as described.

4. In a riding straddle-row cultivator, the combination of a wheel-frame, a pole pivoted thereto on a vertical pivot in advance of the axle, foot-levers hung from the axle and connected by fulcrum-rods to a fixed bar secured to the tongue, and cultivators carried by the frame of the machine, whereby upon pressing upon either of said foot-levers the wheel-frame is angled to the tongue to guide said frame and the cultivator sidewise, substantially as described.

5. In a riding straddle-row cultivator, the combination of a wheel-frame, a pole pivoted thereto on a vertical pivot in advance of the axle and embracing the arch of the axle with a sliding connection, foot-levers hung from the axle and connected by fulcrum-rods, to a fixed bar secured to the tongue, and cultivators carried by the frame of the machine whereby upon pressing upon either of said foot-levers the wheel-frame is angled to the tongue to guide said frame and the cultivator sidewise, substantially as described.

6. In a riding straddle-row cultivator the combination of the cultivator drag-bars K pivoted at their forward ends to the frame of the machine, a wheel-frame comprising the arched axle B and frame-bars C, the pole or tongue D pivoted to the frame C and loosely embracing the arch of the axle, the bar I rigidly secured to the pole, foot-levers J hung from the axle B by pivotal connections and united by rods $i$ with the bar I, substantially as and for the purpose described.

CLEMENT W. MICHAEL.

Witnesses:
JOHN F. CAMPBELL,
F. W. BENTZ.